United States Patent [19]
Kapoor et al.

[11] Patent Number: 5,232,473
[45] Date of Patent: Aug. 3, 1993

[54] PRESSURE SWING ADSORPTION WITH COUNTERCURRENT FEED PRESSURIZATION

[75] Inventors: Akhilesh Kapoor, Clark; Ramachandran Krishnamurthy, Piscataway, both of N.J.; Hung H. Nguyen, Hurstville, Australia

[73] Assignee: The BOC Group, Inc., New Providence, N.J.

[21] Appl. No.: 879,490

[22] Filed: May 7, 1992

[51] Int. Cl.⁵ ............................................. B01D 53/04
[52] U.S. Cl. .................................... 55/26; 55/58; 55/62; 55/68; 55/75
[58] Field of Search .................. 55/25, 26, 33, 58, 62, 55/68, 74, 75

[56] References Cited

U.S. PATENT DOCUMENTS

| | | | |
|---|---|---|---|
| 3,176,444 | 4/1965 | Kiyonaga | 55/62 X |
| 3,430,418 | 3/1969 | Wagner | 55/62 X |
| 3,564,816 | 2/1971 | Batta | 55/26 |
| 3,717,974 | 2/1973 | Batta | 55/58 |
| 3,738,087 | 6/1973 | McCombs | 55/58 |
| 3,788,037 | 1/1974 | Shell et al. | 55/58 |
| 3,796,022 | 3/1974 | Simon et al. | 55/25 |
| 4,077,780 | 3/1978 | Doshi | 55/26 |
| 4,498,910 | 2/1985 | Benkmann | 55/26 X |
| 4,705,541 | 11/1987 | Sircar | 55/26 |
| 4,784,672 | 11/1988 | Sircar | 55/26 |
| 4,810,265 | 3/1989 | Lagree et al. | 55/26 |
| 4,834,780 | 5/1989 | Benkmann | 55/26 |
| 4,981,499 | 1/1991 | Hay et al. | 55/62 X |
| 5,015,272 | 5/1991 | Okada et al. | 55/26 |
| 5,042,995 | 8/1991 | Mitariten | 55/26 |
| 5,051,115 | 9/1991 | Leitgeb et al. | 55/26 |
| 5,082,474 | 1/1992 | Shirley et al. | 55/26 |

*Primary Examiner*—Robert Spitzer
*Attorney, Agent, or Firm*—Coleman R. Reap; Larry R. Cassett

[57] ABSTRACT

A strongly adsorbed gas is recovered from a multicomponent gas mixture comprised of the strongly adsorbed gas, a flammable gas component and oxygen by repeating as essential steps (a) cocurrently passing the gas mixture through a bed of adsorbent which preferentially adsorbs the strongly adsorbed gas, thereby producing a nonadsorbed gas product stream that is depleted in the strongly adsorbed gas, (b) terminating the flow of multicomponent gas mixture into the bed and depressurizing the bed by countercurrently withdrawing a strongly adsorbed gas-enriched product stream from the bed and (c) countercurrently repressurizing the bed with the multicomponent gas mixture.

24 Claims, 3 Drawing Sheets

PRESSURE SWING ADSORPTION WITH COUNTERCURRENT FEED PRESSURIZATION

BACKGROUND OF THE INVENTION

This invention relates to a pressure swing adsorption process, and more particularly to a method of reducing the variability of the composition of a nonadsorbed product stream produced in a pressure wing adsorption process from a dead gas comprising a mixture of two or more gases.

When a gas mixture comprising two or more components having different adsorbabilities with a given adsorbent is processed in a pressure swing adsorption system using the given adsorbent and a conventional pressure swing adsorption cycle to produce an adsorbed product stream enriched in the most strongly adsorbed component and a nonadsorbed product stream that is depleted in the strongly adsorbed component and enriched in the remaining components, the composition of the nonadsorbed product stream generally varies somewhat over the course of the adsorption step of the process. This happens partly because of the particular step or steps that are performed in the pressurization of the adsorption bed and partly because of the difference in adsorbabilities of the various components of the feed stream.

When a pressure swing adsorption process is initially started up the adsorption bed is generally pressurized by cocurrently flowing fresh feed gas mixture into the bed. In subsequent cycles of the process the bed is usually repressurized in one or more steps, which generally include countercurrent pressurization of the bed with nonadsorbed product gas, or cocurrent pressurization of the bed with fresh feed mixture, or a combination of these steps. Each of these steps are consistent with the goal of ensuring that the nonadsorbed end of the bed is substantially free of the most strongly adsorbed component at the commencement of the adsorption step. When the bed is cocurrently pressurized with fresh feed, the most strongly adsorbed component of the mixture is concentrated in the feed end of the bed and the least strongly adsorbed component is concentrated in the nonadsorbed product end of the bed. During countercurrent pressurization with nonadsorbed product gas, any strongly adsorbed component remaining in the bed from the previous cycle is desorbed from the bed and forced toward the feed inlet end of the bed by the incoming nonadsorbed product gas, which is highly concentrated in least strongly adsorbed component.

During the adsorption step, feed gas mixture is passed cocurrently through the bed. As the feed mixture moves through the bed, a wave front is formed, behind which the adsorbate comprises most of the most strongly absorbed component. The gas stream passing through the wave front will, accordingly, be depleted of the most strongly adsorbed component. As the gas stream, now enriched in the less strongly adsorbed components of the gas stream, continues through the bed, a second wave front may be formed in the region beyond the first wave front if the remaining stream contains two or more less strongly adsorbed components having different adsorbabilities. The adsorbate in the region between the first and second wave fronts will contain most of the second most strongly adsorbed component, and the gas stream passing through the second wave front will be depleted in both the most strongly absorbed component and the second most strongly adsorbed component. This phenomenon is repeated until the gas stream is comprised essentially of a single gas or of two or more gases having the substantially equal adsorption rates.

As the adsorption step proceeds, all of the wave fronts will advance toward the nonadsorbed product end of the bed, and as they do so the more strongly adsorbed components will displace the adsorbed less strongly adsorbed components of the adsorbate and force them toward the nonadsorbed product end of the bed. Eventually the more strongly adsorbed components will break through the nonadsorbed product end of the bed and become part of the nonadsorbed product. Because of the above-described phenomenon, the nonadsorbed product stream leaving the bed, which was initially a high purity least strongly adsorbed component stream, will contain greater amounts of the more strongly adsorbed components as the adsorption step proceeds.

For most situations, the variability of the nonadsorbed product composition over the course of the adsorption step of a pressure swing adsorption process is of little consequence. However, in some cases, it is extremely important that the composition of this stream remain within certain limits throughout the adsorption step. For instance, when a gas mixture containing oxygen, a nonflammable gas and a flammable gas or oxygen and two flammable gases is subjected to a pressure swing adsorption process to recover the nonflammable gas or one of the two flammable gases, it is very important to ensure that none of the product streams leaving the adsorption bed constitutes a flammable gas mixture.

In this specification the term "nonflammable gas" means a gas that will not form a flammable mixture when mixed with oxygen in any proportions; the term "flammable gas" means a gas that when mixed with oxygen in certain proportions will form a flammable mixture; and the term "flammable mixture" designates a gas mixture containing a flammable gas and oxygen in such proportions that it will ignite or explode if heated to its self ignition temperature or if it comes in contact with a flame or a spark at the prevailing pressure.

As a specific example of a potentially hazardous situation, it may sometimes be desired or necessary to separate a given component from a gas mixture containing the given component, a flammable gas component and oxygen using an absorbent which most strongly absorbs the given component and least strongly adsorbs oxygen. Assuming that the concentration of the components in the gas mixture is such that the mixture is not a flammable mixture, the given component could be safely separated from the other components by a pressure swing adsorption process using the adsorbent, provided that the nonadsorbed gas product stream remains nonflammable at all times during the adsorption process. If a conventional pressure swing adsorption process in which repressurization of the adsorption bed is effected by bed equalization followed by nonadsorbed product backfill is used to separate the given component from the remaining components, the nonadsorbed gas product will comprise mostly oxygen at the initial part of the adsorption step. However, as the adsorption step proceeds, the concentration of flammable gas component in the nonadsorbed product stream gradually increases until finally a point is reached when the nonadsorbed gas product stream is about to become a flammable mixture. Because of this hazard it is not feasible to separate the given component from this gas mixture by such conventional pressures wing absorption techniques.

U.S. Pat. No. 4,498,910, issued to Benkmann on Feb. 12, 1985, discloses a method of recovering a hydrocarbon from a feed gas containing the hydrocarbon and a minor amount of oxygen by a pressure swing absorption process. The patentee purportedly avoids the development of a flammable gas mixture by cocurrently repressuring the adsorption bed with feed gas allowing the countercurrent desorption of the adsorbed component from the adsorbent.

It can be appreciated from the foregoing discussion that there is a need for a pressure swing adsorption process that can be safely and efficiently used to separate a multicomponent gas mixture into an adsorbed component product stream and a multicomponent nonadsorbed product stream wherein the tendency of the composition of the nonadsorbed product stream to vary over the course of the adsorbed step is minimized. The present invention satisfies this need.

SUMMARY OF THE INVENTION

According to the invention, a component of a gas mixture comprising two or more components is recovered from the gas mixture as the adsorbed component in a pressure swing adsorption process using a unique cycle. The cycle employed permits the desired component to be removed from the mixture while at the same time producing a nonadsorbed product stream having a more uniform composition over the course of the process than can be obtained when using currently available absorption cycles. The principal steps of the cycle are, in sequence: an adsorption step, during which the feed gas mixture is introduced into the feed end of an adsorption bed at a superatmospheric pressure while a nonadsorbed product stream is removed from the product end of the bed; a depressurization step, during which adsorbed product is withdrawn from the feed end of the absorption unit; and a pressurization step, during which the feed gas mixture is introduced into the adsorption until through the product end of the unit.

Although the above steps are the essential steps of the process, other steps are added to the cycle in preferred embodiments to improve the efficiency of the process. According to one preferred embodiment, expansion gas is withdrawn from the product end of the bed after the absorption step is concluded, but before the absorbed product is withdrawn from the bed. Part of the expansion gas may be recycled to the feed stream to the bed or vented to the atmosphere, depending upon the composition of this stream, and/or part of this stream may be used to partially pressurize the same or another adsorption bed following withdrawal of adsorbed product from the bed.

In another preferred embodiment, the adsorption bed is partially pressurized by countercurrently flowing feed gas mixture into the bed and further pressurized by flowing nonadsorbed product into the adsorption unit through its product end. In this embodiment, the nonadsorbed product gas used for the pressurization is preferably withdrawn from the adsorption bed during the latter part of the adsorption step.

In a most preferred embodiment of the invention, repressurization of the adsorption bed is effected in three partial pressurizations comprising first partially pressurizing the bed by expansion gas, then further pressurizing the bed by countercurrently flowing feed gas mixture into the bed, and finally completing the pressurization by countercurrently flowing nonadsorbed product gas into the bed.

BRIEF DESCRIPTION OF THE DRAWINGS

The invention is illustrated by the following drawings.

DETAILED DESCRIPTION OF THE INVENTION

Figure 1:
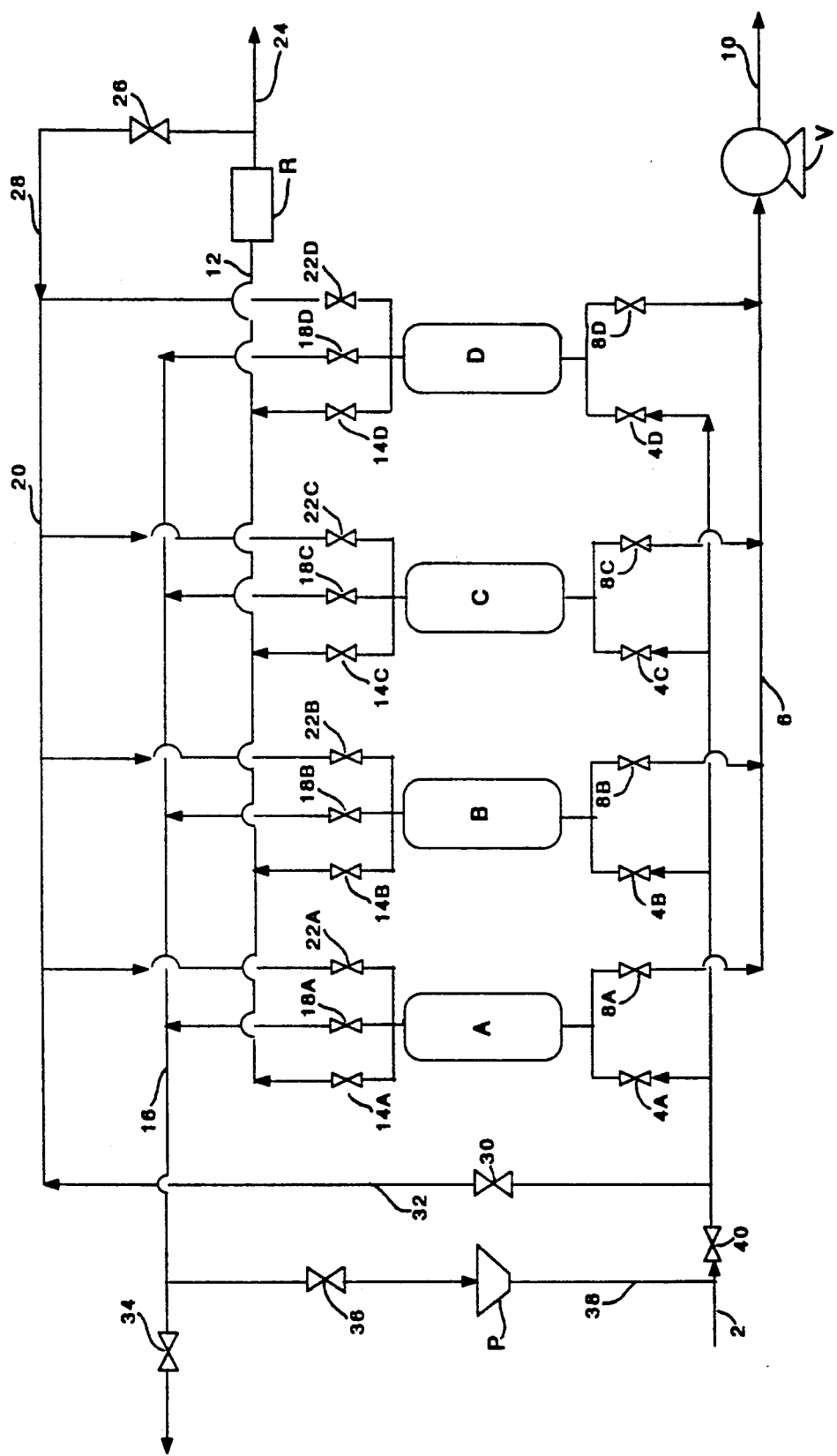
FIG. 1 is a schematic representation of a four bed adsorption system in which the process of the invention can be practiced. Only valves, lines and equipment necessary for an understanding of the invention are illustrated in FIG. 1.

The invention is a pressure swing adsorption process in which a multicomponent feed gas is treated in an adsorption bed or a plurality of adsorption beds in a specific sequence of steps. Although the invention has application in the resolution of two component gas mixtures it will be discussed in detail with respect to the recovery of a strongly adsorbed gas from a gas mixture containing the strongly adsorbed gas from a gas mixture containing the strongly adsorbed gas and two or more less strongly adsorbed gases having different absorbabilities.

The process of the invention can be used to recover any component of a gas mixture that is more strongly adsorbed by the adsorbent employed than are the other components of the mixture. For instance, the invention can be used to separate carbon dioxide from less strongly adsorbed components, such as air (a mixture comprised substantially of nitrogen, oxygen, and argon). An important application of the process of the invention is the treatment of feed gas mixtures comprised of oxygen, a nonflammable gas and a flammable gas or oxygen and two or more flammable gases to recover the most strongly adsorbed component without producing a flammable mixture, wherein the strongly adsorbed component is oxygen-deleted, the feed gas mixture is nonflammable because the concentrations of nonflammable gases and flammable gases therein are sufficiently high that this stream does not constitute a flammable mixture, and the nonadsorbed product gas stream is nonflammable because it is so rich in flammable gas that it likewise does not constitute a flammable mixture. Examples of this application are the recovery of carbon dioxide form a nonflammable gaseous mixture of carbon dioxide, methane and air by means of an adsorbent which most strongly adsorbs carbon dioxide and least strongly adsorbs air components, and the recovery of methane from a nonflammable gaseous mixture of methane, oxygen and hydrogen by means of an adsorbent which most strongly adsorbs methane and least strongly adsorbs hydrogen.

In it broadest aspects, the process of the invention comprises three essential steps: an adsorption step, a desorption step and a countercurrent feed gas pressurization step.

During the adsorption phase of the process, the feed gas mixture is passed through one or more beds containing a selected absorbent at a superatmospheric pressure. The gas entering the bed can be at any pressure above atmospheric pressure, i.e. 14.7 psia (pounds per square inch absolute); however, the adsorption is generally carried out at a pressure in the range of about 20 to 300 psia. The feed gas mixture enters the bed at the feed end of the adsorber and flows cocurrently through the bed, i.e. in the direction from the freed end of the bed towards the nonadsorbed product end of the bed. As the feed mixture passes through the bed the most strongly adsorbed component of the mixture is adsorbed by the adsorbent and the nonadsorbed components pass through the bed and exit the bed at the nonadsorbed product end of the adsorber. As the adsorption step proceeds, the strongly adsorbed component forms an adsorption front which passes cocurrently through the bed. When the adsorption front reaches a predetermined point in the bed, which is usually close to the nonadsorbed product end of the bed, the flow of feed gas mixture into the bed is terminated and the next stage of the process, countercurrent bed depressurization and desorption, begins.

During the countercurrent bed depressurization, the gases remaining in the adsorption bed flow countercurrently through the bed, i.e. in the direction from the nonadsorbed product exit end of the bed toward the feed inlet end of the bed, and they exit the bed through the absorbed product outlet, which is located at the feed inlet end of the bed. As the pressure in the bed drops, the absorbed gas begins to desorb from the bed. The desorption is continued until the desired degree of desorption is attained. Termination of the desorption step can occur at any desired pressure below the adsorption pressure, however the desorption end pressure is generally in the range of about 75 to 1000 torr, and preferably in the range of about 150 to 300 torr. Upon termination of the countercurrent depressurization step, the third essential step, countercurrent feed pressurization, begins.

During countercurrent feed pressurization, feed gas mixture is introduced into the absorption unit at the nonadsorbed product end of the bed and is permitted to flow into the adsorber until the bed pressure reaches a predetermined value. In the broadest embodiment of the invention, this occurs when the adsorption unit is repressurized to approximately the adsorption pressure. When the adsorption pressure is reached, the next adsorption cycle is begun.

The principal advantage of the above-described three step absorption cycle is that the nonadsorbed gas product has a more uniform composition over the course of the adsorption step. This results because of the countercurrent feed pressurization step. Upon the completion of this step, the order of concentration of components in the absorbate in the bed as the distance from the nonadsorbed product outlet increases will be: first, the most strongly adsorbed component; then, the second most strongly adsorbed component; then the third most strongly adsorbed component, and so on. It can be appreciated then that the absorbed least strongly adsorbed component will be concentrated closer to the feed end of the bed than any of the other components. Accordingly, when the succeeding adsorption step begins the concentration of the more strongly adsorbed components in the nonadsorbed product stream will be higher than would be the case if conventional nonadsorbed product pressurization and/or cocurrent feed pressurization were employed, and since the concentration of strongly adsorbed components in the nonadsorbed product gas stream increases gradually as the adsorption step proceeds, there will be less variation in the nonadsorbed product composition over the course of the adsorption step.

Although the above three-step cycle provides a decided improvement in nonadsorbed product gas composition uniformity during the adsorption step, it does so at the expense of adsorbed product purity and yield. The reduction in adsorbed product purity results because the strongly adsorbed product stream leaving the adsorption unit during the countercurrent depressurization step includes all of the moderately adsorbed and weakly adsorbed components contained in the void space gas and in the absorbed phase in equilibrium with the void space gas when this step begins. The reduced adsorbed product yield results because the nonadsorbed product end of the bed is loaded with the most strongly adsorbed component as the adsorption step begins. Consequently, more of the most strongly adsorbed component will be swept into the nonadsorbed product stream leaving the bed than would be the case if conventional nonadsorbed pressurization procedures were employed.

The above disadvantages can be partially or completely eliminated by incorporating one or more of the following steps into the operating cycle.

In one of the preferred operating cycles of the invention, one or more cocurrent depressurization steps are added to the cycle between the adsorption step and the countercurrent depressurization step. Depending upon the composition of the void space gas at the end of the adsorption step, part or all of the expansion gas released during the cocurrent depressurization can be recycled to the feed stream to the adsorption system, combined with the nonadsorbed product stream, vented to the atmosphere or used for partial pressurization of the same or another adsorption bed in the system. If the expansion gas stream is rich in the strongly adsorbed gas component, it is preferable to recycle this stream to the feed stream or use it for partial pressurization of a bed; if it contains a significant concentration of valuable or useful nonadsorbed product components, it can be combined with the nonadsorbed product gas stream; and if it is comprised substantially of low value components that are not harmful to the environment, it can be vented to the atmosphere. The principal benefit derived from the addition of this step to the operating cycle is the increased purity of the strongly adsorbed product stream.

In another preferred embodiment, a part of the most strongly adsorbed component product gas is compressed and cocurrently fed into the bed as a purge stream prior to countercurrent depressurization. This purge stream forces the least strongly adsorbed and moderately adsorbed components out of the bed, thereby increasing the concentration of most strongly adsorbed component in the bed. This results in the production of a higher purity strongly adsorbed component product stream.

In another preferred embodiment, the absorption bed is partially pressurized after the countercurrent depressurization step but prior to the countercurrent feed pressurization step with expansion gas produced in the cocurrent depressurization step described above. Any part or all of the expansion gas produced in the cocurrent depressurization can be used for this step. The expansion gas can be introduced into the adsorber through either the feed inlet end or the nonadsorbed product outlet end of the bed. The principal advantage of this step is that it provides increased recovery of the components of the feed gas and conserves the energy stored in the high pressure expansion gas, thereby rendering the entire process more efficient. In multiple bed systems it is often convenient to simply cross-connect a bed undergoing depressurization and a bed undergoing partial repressurization, and permit the pressure in the two beds to approximately reach equilibrium.

In another preferred embodiment, the adsorption unit is first partially pressurized by countercurrently introducing feed gas mixture into the unit and then further pressurized by countercurrently introducing the nonadsorbed product gas into the unit. This step serves to increase the yield of adsorbed product gas withdrawn from the adsorber during countercurrent depressurization. The reason for this is not known with certainty, however, it appears the introducing nonadsorbed product gas countercurrently into the adsorption unit creates a concentration gradient between the strongly adsorbed component adsorbed by the bed and that in the void space surrounding the absorbent particles, thereby causing desorption of the strongly adsorbed component. The desorbed strongly adsorbed component is then forced toward the feed inlet end of the bed, thereby reducing the amount of most strongly adsorbed component removed with the nonadsorbed product in the following adsorption step. This step is preferably effected by using nonadsorbed product gas produced in a preceding adsorption step as the pressurizing gas. It is particularly preferred to use nonadsorbed product gas that was produced towards the end of the adsorption step, because this part of the nonadsorbed product gas stream contains more of the moderately adsorbed gas than earlier produced nonadsorbed product gas. Using nonadsorbed product gas produced in the last part of the adsorption cycle results in less variation in nonadsorbed gas product produced during the following adsorption step.

In the most preferred embodiment of the invention, the repressurization of the bed following countercurrent withdrawal of desorbed strongly adsorbed component from the bed is carried out in three steps: an initial partial pressurization with part or all of the expansion gas withdrawn from the bed in the cocurrent depressurization step, a further partial pressurization by countercurrent flow of feed gas mixture into the absorption bed, and a final pressurization by countercurrent flow of nonadsorbed product gas into the bed. This embodiment provides as advantages, enhanced purity and yield of strongly absorbed gas product stream, realized from the reasons noted above, and energy savings, resulting from conservation of the energy stored in the expansion gas.

The sequence of steps for the most preferred embodiment is:

1. Adsorption: Feed gas mixture flows cocurrently through the adsorption bed at high pressure and strongly adsorbed component-depleted product gas is cocurrently withdrawn from the bed.

2. Cocurrent Depressurization—Equalization: Flow of feed gas mixture into the bed is terminated and the bed is depressurized to a predetermined reduced pressure by cocurrent withdrawal of expansion gas from the bed. Part of the expansion gas may be recycled to the feed stream, combined with the strongly adsorbed component-depleted product gas, or vented to the atmosphere; and the remainder used in Step 4 (described below) to partially repressurize the adsorption bed. Alternatively, all of the expansion gas may be used for the step 4 partial pressurization.

3. Countercurrent Depressurization: The bed is depressurized to a low pressure by countercurrent withdrawal of strongly adsorbed component-enriched product gas from the bed. The depressurization may occur in two steps: a first depressurization to atmospheric or near atmospheric pressure, and a second depressurization to subatmospheric pressure by means of vacuum.

4. Partial Pressurization—Equalization: The bed is partially repressurized by the flow of expansion gas (obtained in step 2, above) into the bed.

5. Countercurrent Feed Pressurization: The bed is further pressurized by countercurrent flow of feed gas mixture into the bed until a predetermined pressure is attained in the bed. The extent of feed pressurization is determined by the relative concentration of strongly adsorbed component and weakly adsorbed component in the feed gas mixture; the lower the concentration of most strongly adsorbed component in the feed gas mixture, the greater the pressure to which the bed is pressurized with feed gas mixture.

6. Countercurrent Nonadsorbed Product Pressurization: The final bed pressurization is accomplished by the countercurrent flow of nonadsorbed product gas into the bed. The gas for this step is preferably obtained from a bed as it approaches the end of the adsorption step.

Although the embodiments in which the adsorption bed undergoes final repressurization with nonadsorbed product gas are more efficient from the standpoint of high strongly adsorbed product yield, it is sometimes preferable to eliminate this step form the process and effect final pressurization by countercurrent flow of feed gas into the bed. This is the case when the system is being started up or when a process upset occurs. When the process is being started up, the bed is relatively clean. If the bed is pressurized with nonadsorbed product gas, the bed at the nonadsorbed product end of the adsorption unit will contain little or no strongly adsorbed component. Therefore the nonadsorbed product gas produced at the beginning of the adsorption step will comprise mostly least strongly adsorbed component, and as the adsorption step proceeds the concentration of moderately adsorbed components in the nonadsorbed product stream will gradually increase. In the case in which the least strongly adsorbed component of the feed mixture is oxygen or air and the moderately adsorbed component is a flammable gas, a flammable gas mixture may eventually issue from the bed. This situation can be avoided by completely countercurrently pressurizing the bed with feed gas. This will ensure that the concentration of strongly adsorbed component in the bed at the nonadsorbed product end of the unit is high. Then, when the adsorption step is begun, the nonadsorbed product initially produced will contain a relatively high concentration of strongly adsorbed component, and the danger of producing a flammable mixture as the nonadsorbed product is considerably lessened or entirely eliminated.

The process of the invention, particularly the above-described most preferred embodiment of the process, is readily adaptable to practice in multibed system, i.e. adsorption systems comprised of two or more adsorption units arranged in parallel and operated out of phase with each other. In multibed systems that are operated out of phase, the various beds will be concurrently undergoing different operations. For example, one bed in the system will be undergoing step 2, cocurrent depressurization, at the same time that another bed is undergoing step 4, countercurrent partial repressurization. In this case, it is convenient to cross-connect a bed undergoing step 2 with a bed undergoing step 4 and permit part or all of the expansion gas leaving the step 2 bed to flow directly to the step 4 bed.

In a similar manner, nonadsorbed gas being produced in a bed undergoing step 1 can be used to pressurize another bed that is simultaneously undergoing step 6 by cross-connecting these two beds and diverting all or a portion of the gas being produced in the step 1 bed at any given time into the step 6 bed. The step 6 bed is "rapidly" pressurized if all of the step 1 bed effluent is diverted to the step 6 bed and "slowly" pressurized if only a portion of the step 1 bed gas is diverted to the step 6 bed. If is often preferred to divert all of the gas leaving the step 1 bed to the step 6 bed to effect a rapid final pressurization of the bed in step 6.

One of the more efficient multibed systems is the four-bed system illustrated in FIG. 1. In such a system, each bed is operated sequentially and 90 degrees out of phase relative to each preceding bed in the sequence. A four-bed system provides a substantially continuous flow of product gas streams. Considering FIG. 1 in detail, the absorption system illustrated therein comprises four adsorbers, A, B, C and D; a nonadsorbed product gas reservoir, R (optional), a vacuum pump, V and a gas compressor, P. On their feed inlet ends, adsorbers, A, B, C and D are connected to feed gas line 2 via valves 4A, 4B, 4C and 4D, respectively, and to desorbed gas discharge line 6 via valves 8A, 8B, 8C and 8D, respectively. Line 6 is connected to the suction end of vacuum pump V, which, in turn, discharges to line 10.

On their nonadsorbed gas product outlet ends, adsorbers A, B, C and D communicate with nonadsorbed gas product line 12 via valves 14A, 14B, 14C and 14D, respectively; with vent/recycle gas line 16 via valves 18A, 18B, 18C, and 18D, respectively; and with feed/nonadsorbed product repressurization gas line 20 via valves 22A, 22B, 22C and 22D, respectively. Nonadsorbed product gas line 12 is connected to nonadsorbed product gas reservoir R, which in turn, is connected to nonadsorbed product gas discharge line 24. Reservoir R may be eliminated, if desired, or positioned downstream for nonadsorbed product gas storage. A nonreturn valve (not shown) can be inserted in line 12 upstream of reservoir R to prevent backflow of product gas to the adsorbers. Valve 26 in nonadsorbed product pressurization gas supply line 28 permits line 24 to be connected to line 20, and valve 30 in feed pressurization gas supply line 32 permits feed gas line 2 to communicate with line 20. Gas in vent/recycle gas line 16 can be discharged to the atmosphere through valve 34 or to the suction end of compressor P through valve 36. Compressor P discharges into line 38 which, in turn, communicates with feed line 2.

The process of the invention will now be described using the six step cycle described above and the cycle sequence set forth in Table 1. As indicated in Table 1, the six steps of the cycle are divided into sixteen substeps, with the adsorption phase being carried over a four substep block, the countercurrent depressurization occupying a seven substep block and the cocurrent depressurization being divided into a first substep in which the expansion gas being discharged from the bed is vented to the atmosphere, and a second substep in which the expansion gas is used to pressurize another bed. The valve sequence for the cycle sequence of Table 1 is set forth in Table 2. During the described cycle, valve 36 is closed and compressor P is idle. Valve 40 is used to control the rate of feed gas mixture to the system.

During substep 1, valves 4A, 8B, 8C, 14A, 18D, 34 and 40 are open and all other valves are closed. Fresh feed entering the system through line 2 at the desired absorption pressure flows through valve 4A and into bed A, which has just completed pressurization. Strongly adsorbed component is adsorbed from the gas stream as it passes through bed A and a nonadsorbed product stream rich in the least strongly absorbed component(s) emerges from adsorber A through valve 14A, flows through nonadsorbed gas product line 12 and enters nonadsorbed gas product reservoir R. Meanwhile, strongly adsorbed component product gas is being withdrawn from adsorbers B and C through valves 8B and 8C, respectively, and the desorbed gas discharge line 6 by vacuum pump V. After passing through pump V, the strongly adsorbed product is sent to storage via line 10. During substep 1, bed D undergoes cocurrent depressurization to vent, with the discharged expansion gas leaving the system through valve 18D, vent/recycle gas line 16 and valve 34.

During substep 2, valves 4A, 8C, 14A, 18B, 18D and 40 are open and all other valves are closed. Beds A and C continue to undergo adsorption and countercurrent depressurization, respectively, and bed D continues to undergo cocurrent depressurization, but the expansion gas leaving bed D is channeled through line 18B to bed B, which now undergoes countercurrent partial repressurization. At the end of this step, the pressures in beds B and D are usually approximately equal.

During the next substep, substep 3, valves 4A, 8C, 8D, 14A, 22B, 30 and 40 are open and all other valves are closed. During this substep, beds A and C continue to undergo adsorption and countercurrent depressurization, respectively, as in substeps 1 and 2. Bed D now undergoes countercurrent depressurization, with the strongly adsorbed product leaving this bed and the system through valve 8D, line 6, vacuum pump V and line 10. Meanwhile, bed B is being further partially pressurized by countercurrently flowing feed gas mixture into this bed through feed pressurization gas line 32, valve 30, feed/nonadsorbed repressurization gas line 20, and valve 22B.

The next substep in the cycle is substep 4. During this substep, valves 4A, 8C, 8D, 14A, 22B, 26 and 40 are open and all other valves are closed. During this step, bed A continues to undergo adsorption and beds C and D continue to undergo countercurrent depressurization, all as in substep 3. Bed B now undergoes final repressurization by the countercurrent flow of nonadsorbed product gas into this bed through valve 26, nonadsorbed product pressurization gas supply line 28, line 20 and valve 22B.

Substeps 5 to 8, 9 to 12 and 13 to 16 are each repetitions of substeps 1 to 4, except that in each of these sets of substeps, the operations described in each bed in substeps 1 to 4 are carried out in different beds of the system in the subsequent sets of substeps. Thus, in substeps 5 to 8, the cycle is shifted 90 degrees, so that bed B replaces bed A, bed C replaces bed B, bed D replaces bed C and bed A replaces bed D in the operations carried out in substeps 1 to 4; in substeps 9 to 12, the cycle is shifted 180 degrees, so that bed C replaces bed A, bed D replaces bed B, bed A replaces bed C and bed B replaces bed D in the operations carried out in substeps 1 to 4; and in substeps 13 to 16, the cycle is shifted 270 degrees, so that bed D replaces bed A, bed A replaces bed B, bed B replaces bed C and bed C replaces bed D in the operations carried out in steps 1 to 4. As noted above, the cycle sequence and the valve sequence for each of the substeps 1 to 16 are set forth in Tables 1 and 2, respectively.

In the cycle described in Table 1, the expansion gas released from the beds in the first part of each cocurrent depressurization step is vented to the atmosphere through valve 34 of the system illustrated in FIG. 1. If desired, this portion of the expansion gas could instead by recycled to feed inlet line 2. This change can be implemented by opening valve 36 instead of valve 34 at the correct time in the sequent. If the fresh feed entering line 2 is already at the desired adsorption pressure, gas being recycled through valve 36 would have to be pressurized in compressor P. If, on the other hand, the gas passing through valve 36 enters line 2 upstream of the point that the gas in line 2 is pressurized to the desired adsorption pressure, compressor P is unnecessary. In the other alternative noted above, the expansion gas released in the first part of the cocurrent depressurization could be directed to nonadsorbed product storage, with or without additional compression, by means not illustrated in FIG. 1.

The invention is further illustrated in the following specific examples, in which, unless otherwise specified, expressed parts, percentages and ratios are on a volume basis. In the examples, a coal mine gas containing 30% carbon dioxide, 35% methane and 35% air was subjected to a pressure swing adsorption process in a four bed system of the type illustrated in FIG. 1. The beds of each adsorber contained 1/16 inch beads of 13X molecular sieve adsorbent, sold by UOP Company of Moorestown, N.J. under the trade designation UOP-13X-APG. The process was operated at an adsorption pressure of 75 psia and a final countercurrent depressurization of 3 psia. When resolving such a gas mixture, it is important that all gas streams entering and leaving the system are at all times nonflammable. The gas stream entering the system is nonflammable at 75 psia because of its high concentrations of carbon dioxide and methane. The strongly adsorbed product stream is also nonflammable because of its high concentration of carbon dioxide. However, as shown in the following examples the nonadsorbed product stream may become unsafe if conventional PSA cycles are used.

TABLE 1

Cycle Step Sequence For A 4-BED PSA Process

| Step 1 | Bed A | Bed B | Bed C | Bed D |
|---|---|---|---|---|
| 1 | ADSORPTION | COUNTER. DEP. | COUNTER. DEP. | COCURR. DEP.- V |
| 2 | ADSORPTION | PART. PRESS.- EQ | COUNTER. DEP. | COCURR. DEP.- EQ |
| 3 | ADSORPTION | COUNT. FD. PRESS. | COUNTER. DEP. | COUNTER. DEP. |
| 4 | ADSORPTION | COUNT. NP. PRESS. | COUNTER. DEP. | COUNTER. DEP. |
| 5 | COCURR. DEP.- V | ADSORPTION | COUNTER. DEP. | COUNTER. DEP. |
| 6 | COCURR. DEP.- EQ | ADSORPTION | PART. PRESS.- EQ | COUNTER. DEP. |
| 7 | COUNTER. DEP. | ADSORPTION | COUNT. FD. PRESS. | COUNTER. DEP. |
| 8 | COUNTER. DEP. | ADSORPTION | COUNT. NP. PRESS | COUNTER. DEP. |
| 9 | COUNTER. DEP. | COCURR. DEP.- V | ADSORPTION | COUNTER. DEP. |
| 10 | COUNTER. DEP. | COCURR DEP.- EQ | ADSORPTION | PART. PRESS.- EQ |
| 11 | COUNTER. DEP. | COUNTER. DEP. | ADSORPTION | COUNT. FD. PRESS. |
| 12 | COUNTER. DEP. | COUNTER. DEP. | ADSORPTION | COUNT. NP. PRESS. |
| 13 | COUNTER. DEP. | COUNTER. DEP. | COCURR. DEP.- V | ADSORPTION |
| 14 | PART. PRESS.- EQ | COUNTER. DEP. | COCURR. DEP.- EQ | ADSORPTION |
| 15 | COUNT. FD. PRESS. | COUNTER. DEP. | COUNTER. DEP. | ADSORPTION |
| 16 | COUNT. NP. PRESS. | COUNTER. DEP. | COUNTER. DEP. | ADSORPTION |

Notes:
COCURR. DEP.- V = COCURRENT DEPRESSURIZATION - VENT
COCURR. DEP.- EQ = COCURRENT DEPRESSURIZATION - EQUALIZATION
PART. PRESS.- EQ = PARTIAL PRESSURIZATION - EQUALIZATION
COUNT. FD. PRESS. = COUNTERCURRENT FEED PRESSURIZATION
COUNT. NP. PRESS. = COUNTERCURRENT NONADSORBED PRODUCT PRESSURIZATION
COUNTER. DEP. = COUNTERCURRENT DEPRESSURIZATION

TABLE 2

| Step | 4 Bed Valve Sequence<br>Valves Open |
|---|---|
| 1 | 4A, 8B, 8C, 14A, 18D, 34, 40 |
| 2 | 4A, 8C, 14A, 18B, 18D, 40 |
| 3 | 4A, 8C, 8D, 14A, 22B, 30, 40 |
| 4 | 4A, 8C, 8D, 14A, 22B, 26, 40 |
| 5 | 4B, 8C, 8D, 14B, 18A, 34, 40 |
| 6 | 4B, 8D, 14B, 18A, 18C, 40 |
| 7 | 4B, 8A, 8D, 14B, 22C, 30, 40 |
| 8 | 4B, 8A, 8D, 14B, 22C, 26, 40 |
| 9 | 4C, 8A, 8D, 14C, 18B, 34, 40 |
| 10 | 4C, 8A, 14C, 18B, 18D, 40 |
| 11 | 4C, 8A, 8B, 14C, 22D, 30, 40 |
| 12 | 4C, 8A, 8B, 14C, 22D, 26, 40 |
| 13 | 4D, 8A, 8B, 14D, 18C, 34, 40 |
| 14 | 4D, 8B, 14D, 18A, 18C, 40 |
| 15 | 4D, 8B, 8C, 14D, 22A, 30, 40 |
| 16 | 4D, 8B, 8C, 14D, 22A, 26, 40 |

EXAMPLE 1

In this example, the six step sequence outlined in Table 1 was employed with the following specifics:
Step 1. Adsorption—240 sec (seconds)
Step 2a. Cocurrent Depressurization—Vent—30 sec. The expansion gas was vented to the atmosphere.
Step 2b. Cocurrent Depressurization—Equalization—30 sec. The expansion was used to pressurize another adsorber.
Step 3. Countercurrent Depressurization—450 s.
Step 4. Partial Pressurization—Equalization—30 sec. The bed was countercurrently partially pressurized with expansion gas from another bed undergoing step 2b, above.

Step 5. Countercurrent Feed Pressurization—120 sec. The bed is pressurized to an intermediate pressure by the countercurrent flow of feed gas into the bed.

Step 6. Countercurrent Nonadsorbed Product Pressurization—60 sec. The bed was pressurized to the final repressurization pressure by the countercurrent flow into the bed of nonadsorbed product gas produced in another bed near the end of its adsorption cycle.

The total cycle time for the cycle of this example was 16 minutes. The process was carried out for a period of 24 hours. The carbon dioxide-enriched product purity, yield and specific product are tabulated in Table 3.

Figure 2:
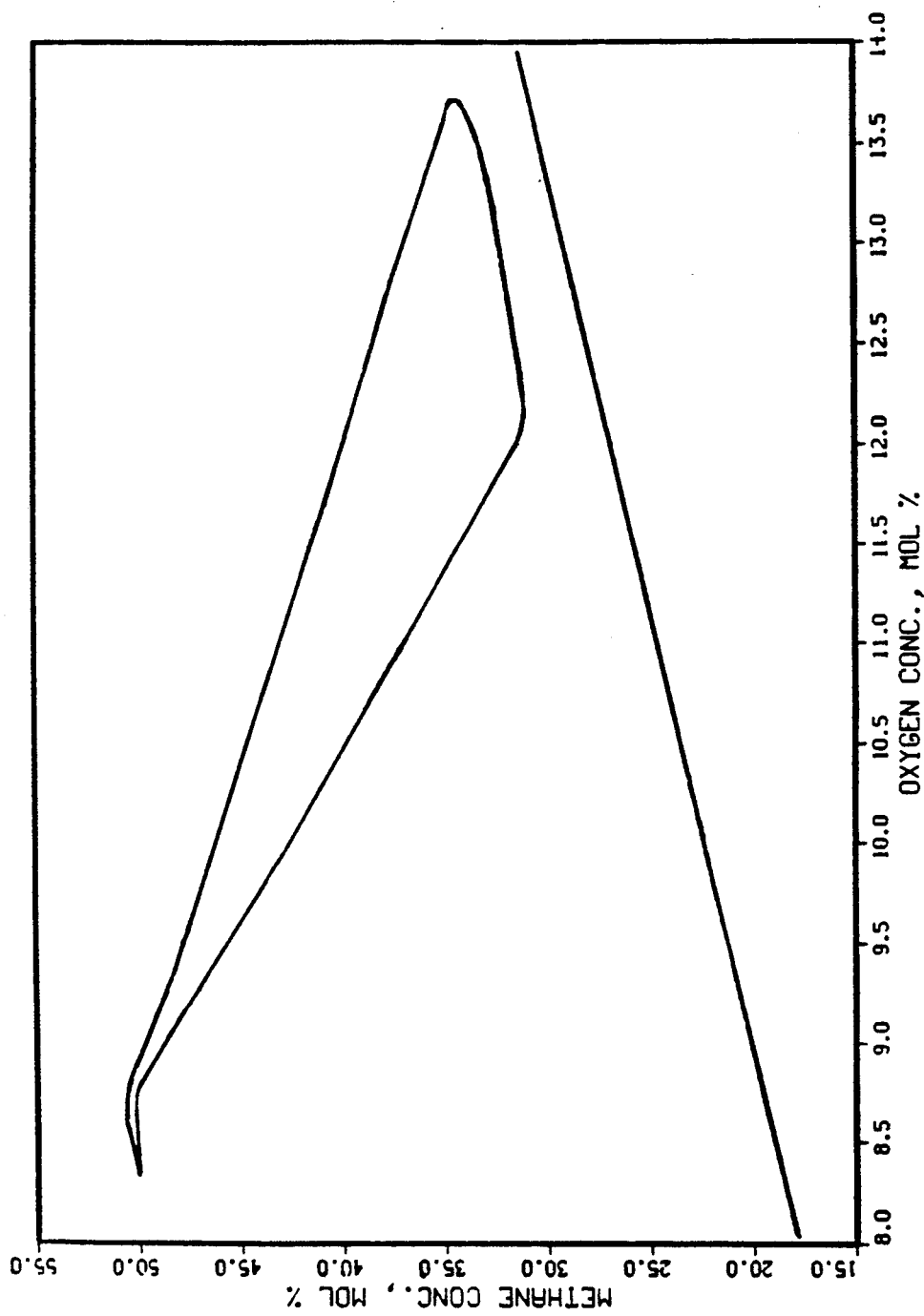
FIG. 2 is a graph of the concentration of oxygen versus methane in the nonadsorbed product gas stream produced during the cycle carried out in Example I.

The time variant composition of the nonadsorbed product stream in the form of a plot of oxygen concentration versus methane concentration for the Example 1 run is shown in FIG. 2. The envelope in the upper part of FIG. 2 is the plot of oxygen concentration vs methane concentration in the nonadsorbed product. The positive slope line in the bottom part of FIG. 2 is the curve that defines the nonflammable mixture safe limit. In the described system the "safe limit" is arbitrarily defined as a methane concentration that is 30% greater than the upper flammability limit for the given carbon dioxide-methane-oxygen system. The region above the curve represents the nonflammable mixture zone. To avoid the formation of a flammable mixture, it is imperative that the composition of the nonadsorbed product stream be above the safe limit line at all times.

EXAMPLE 2

Comparative

Figure 3:
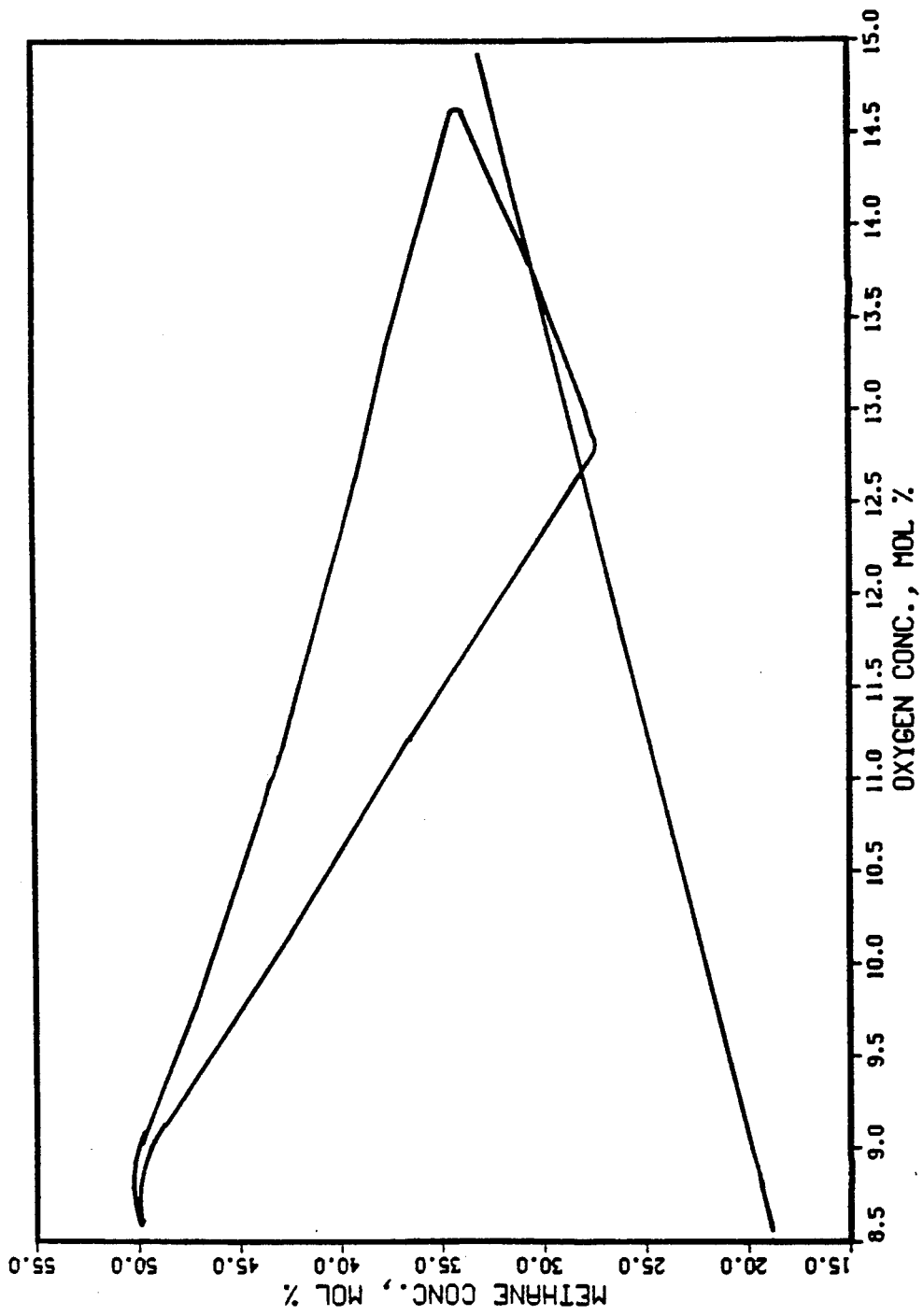
FIG. 3 is a graph of the concentration of oxygen versus methane in a nonadsorbed product gas stream produced during the cycle carried out in Example II.

The procedure of Example 1 is repeated except that step 5 was eliminated and step 6 was carried out for a period of 180 seconds. The carbon dioxide-enriched product purity, yield and specific product are tabulated in Table 3. The time variant composition of the nonadsorbed product stream in the form of a plot of oxygen concentration versus methane concentration for the run of this example is shown in FIG. 3. As in FIG. 2, the curve defining the envelope of oxygen concentration vs methane concentration in the nonadsorbed product and the safe limit line are shown in FIG. 3.

TABLE 3

| Comparison of Separation Performance Of The Cycle Of Examples 1 and 2 | | |
|---|---|---|
| Separation Parameter | Example 1 | Example 2 |
| $CO_2$ Product Purity, % | 97.42 | 97.48 |
| $CO_2$ Recovery, % | 78.38 | 78.02 |
| $CO_2$ Specific Product | 1.824 | 1.826 |

The $CO_2$ Product Purity is the mole percent of $CO_2$ in the $CO_2$ product stream; the $CO_2$ Recovery is the mole percent of $CO_2$ in the feed that is recovered in the $CO_2$ product stream; and the $CO_2$ Specific Product is the amount of $CO_2$ product produced in standard cubic feet per minute per cubic foot of adsorbent in one bed.

An examination of Table 3 shows that the carbon dioxide product purities, recoveries and specific products for the runs of Examples 1 and 2 are substantially equal. However, a significant different in the nonadsorbed product compositions over the course of the adsorption steps of these runs is revealed in FIGS. 2 and 3. The nonadsorbed product composition for the run of Example 1 remains at all times well above the safe limit line. This indicates that this product stream is never flammable over the course of the absorption process of Example 1. This results from the fact that the composition of the nonadsorbed product stream varies less over the course of the adsorption step of the process of Example 1. On the other hand, the nonadsorbed product composition for the run of Example 2 falls below the safe limit during the course of the adsorption step of this example, indicating that a flammable mixture is created during the adsorption step of this example. This happens because of the relatively wide variation of the nonadsorbed product composition over the course of the adsorption steps of the process of Example 2.

Although the invention is described with reference to a specific example, the scope of the invention is not limited thereto. For example, the invention can be used to recover a strongly adsorbed hydrocarbon from a mixture of the strongly adsorbed hydrocarbon, a less strongly adsorbed hydrocarbon and oxygen. Furthermore, steps can be added to the adsorption cycle described above, or the sequence of certain of the steps can be changed.

The invention can also be applied to the recovery of a strongly adsorbed gas from a two-component gas mixture containing the strongly adsorbed gas and a less strongly adsorbed gas by a pressure swing adsorption process. In certain cases it may be desirable to recover some of the strongly adsorbed gas from the gas mixture while at the same time minimizing the variation of the composition of the nonadsorbed product stream over the course of the adsorption step. For example, there sometimes exist two-component mixtures of a strongly adsorbed flammable gas and less strongly adsorbed oxygen which are so rich in the flammable gas that they are nonflammable. In some instances it may be desirable to recover some of the flammable gas from the mixture by pressure swing adsorption without causing the nonadsorbed product stream to become flammable at any time during the course of the adsorption. This can be conveniently accomplished by practicing the process of the invention in such a manner that the nonadsorbed product stream always contains sufficient flammable gas to maintain it nonflammable.

The scope of the invention is limited only by the breadth of the appended claims.

We claim:

1. A process for recovering a selected gas from a feed gas mixture by pressure swing adsorption in a bed of adsorbent which preferentially adsorbs said selected gas comprising cyclically repeating the steps:
   (a) cocurrently flowing said feed gas mixture into said bed at superatmospheric pressure thereby causing said selected gas to be adsorbed, while cocurrently withdrawing selected gas-depleted product gas from said bed;
   (b) terminating flow of feed gas mixture into said bed when the selected gas adsorption front reaches a predetermined point in said bed;
   (c) countercurrently withdrawing selected gas-enriched product gas from said bed; and
   (d) pressurizing said bed by countercurrently flowing feed gas mixture into said bed.

2. The process of claim 1, further comprising, between steps (b) and (c), the additional step of cocurrently withdrawing expansion gas from said bed, thereby partially depressurizing said bed.

3. The process of claim 2, further comprising between steps (c) and (d), the additional step of flowing at least part of said expansion gas into said bed, thereby partially pressurizing said bed.

4. The process of claim 3 carried out in a plurality of adsorption beds arranged in parallel relationship and operated out of phase relative to one another such that at least one adsorption bed is receiving expansion gas from at least one other adsorption bed that is simultaneously discharging expansion gas.

5. The process of claim 1, further comprising between steps (b) and (c), the additional step of cocurrently flowing selected gas-enriched product through said bed.

6. The process of claim 1, wherein step (c) comprises a first step in which the pressure in the bed is reduced substantially to atmospheric pressure and a second step in which the pressure in the bed is reduced to subatmospheric pressure.

7. The process of any one of claims 1 to 3, 5, or 6, further comprising after step (d), the additional step of countercurrently flowing selected gas-depleted product gas into said bed, thereby further pressurizing said bed.

8. The process of claim 7, wherein the selected gas-depleted product gas countercurrently flowed into said bed is product gas cocurrently withdrawn from said bed in the latter part of step (a).

9. The process of any one of claims 1 to 3, 5 or 6, wherein said feed gas mixture comprises a flammable gas and oxygen.

10. A process of recovering a selected gas from a feed gas mixture comprising three or more components by pressure swing adsorption in a bed of absorbent which preferentially adsorbs said selected gas comprising sequentially repeating the steps:
    (a) cocurrently flowing said feed gas mixture into said bed at superatmospheric pressure, thereby causing said selected gas to be adsorbed, while cocurrently withdrawing selected gas-depleted product gas from said bed;
    (b) terminating flow of feed gas mixture into said bed when the selected gas adsorption front reaches a predetermined point in said bed;
    (c) cocurrently withdrawing expansion gas from said bed, thereby partially depressurizing said bed;
    (d) countercurrently withdrawing selected gas-enriched product gas from said bed, thereby further depressurizing said bed;
    (e) flowing expansion gas into said bed, thereby partially pressurizing said bed; and
    (f) countercurrently flowing feed gas mixture into said bed, thereby further pressurizing said bed.

11. The process of claim 10, further comprising as step (g) countercurrently flowing selected gas-depleted product gas into said bed, thereby further pressurizing said bed.

12. The process of claim 11, wherein the selected gas-depleted product gas countercurrenly flowed into said bed is product gas cocurrently withdrawn from said bed in the latter part of step (a).

13. The process of claim 11, wherein said feed gas mixture comprises two or more flammable gases and an oxygen-containing gas.

14. The process of claim 13, wherein said oxygen-containing gas is selected form oxygen and air.

15. The process of claim 11, wherein said feed gas mixture comprises a nonflammable gas, a flammable gas and an oxygen-containing gas.

16. The process of claim 15, wherein said flammable gas is a hydrocarbon.

17. The process of claim 16, wherein said flammable gas is methane.

18. The process of claim 17, wherein said nonflammable gas is carbon dioxide.

19. The process of claim 18, wherein said feed gas mixture comprises carbon dioxide, methane and air.

20. A process for recovering a selected gas from a feed gas mixture comprising said selected gas, a flammable gas and oxygen, the concentration of selected gas and flammable gas in said feed gas mixture being sufficiently great to render said feed gas mixture nonflammable, comprising sequentially repeating the steps:
    (a) cocurrently flowing said feed gas mixture into said bed at superatmospheric pressure, thereby causing said selected gas to be adsorbed, and cocurrently withdrawing a selected gas-depleted product stream from said bed, the concentration of flammable gas component in said selected gas-depleted product stream being sufficiently great to render said selected gas-depleted product stream nonflammable;
    (b) terminating the flow of feed gas mixture into said bed when the selected gas adsorption front in said bed reaches a predetermined point;
    (c) cocurrently withdrawing expansion gas from said bed, thereby partially depressurizing said bed;
    (d) countercurrently withdrawing inert gas-enriched product gas from said bed, thereby further depressurizing said bed;
    (e) flowing expansion gas into said bed, thereby partially pressurizing said bed;
    (f) countercurrently flowing feed gas mixture into said bed thereby further pressurizing said bed, and
    (g) countercurrently flowing selected gas-depleted product stream into said bed thereby further pressurizing said bed.

21. The process of claim 20 wherein said selected gas is a nonflammable gas.

22. The process of claim 20, wherein said selected gas is a second flammable gas.

23. The process of claim 22, wherein said second flammable gas is a hydrocarbon other than methane.

24. The process of claim 21 or claim 22, wherein said flammable gas is methane or hydrogen.

* * * * *